Patented Mar. 24, 1931

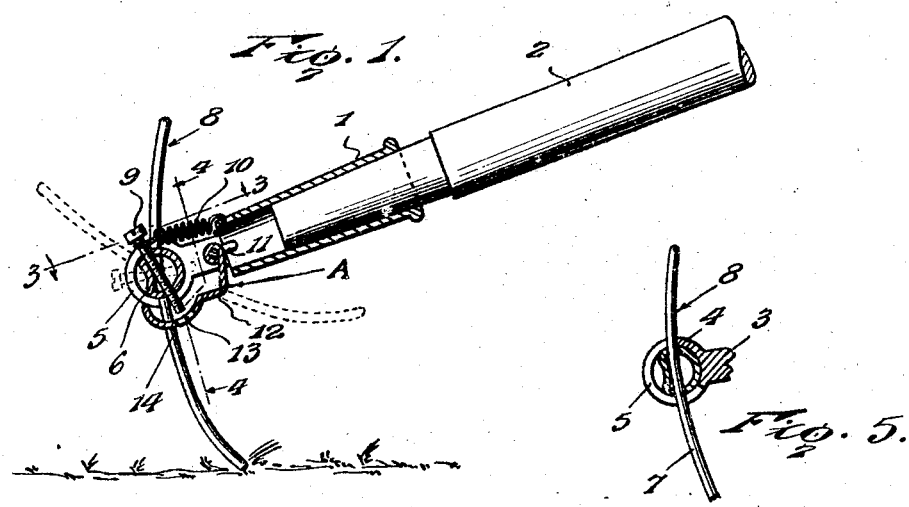
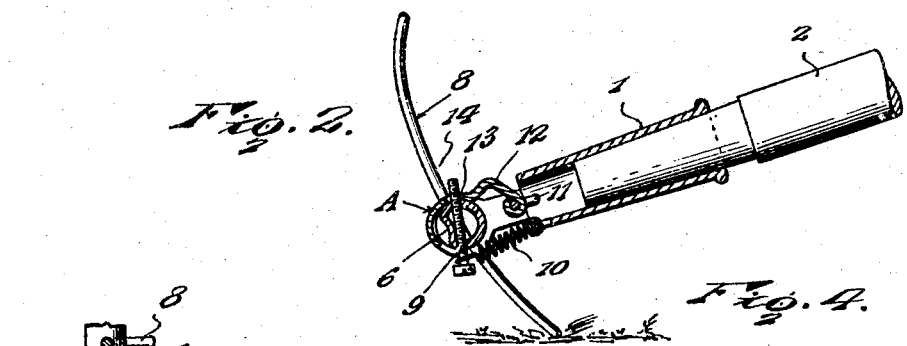
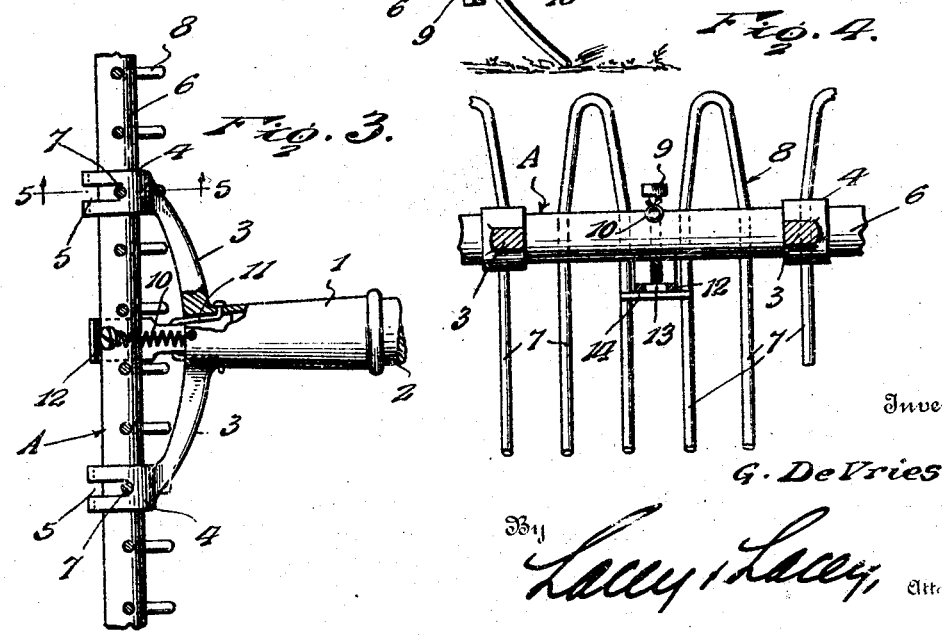

1,797,333

UNITED STATES PATENT OFFICE

GERRIT DE VRIES, OF PIPESTONE, MINNESOTA

SELF-CLEANING LAWN RAKE

Application filed April 17, 1929. Serial No. 355,961.

The present invention is directed to improvements in self cleaning lawn rakes.

The primary object of the invention is to provide a device of this character constructed in such manner that the litter gathered can be easily dislodged from the teeth without the necessity of lifting the rake for removing the litter by hand.

Another object of the invention is to provide a device of this kind capable of being used in a non-self cleaning position upon inverting the rake.

Another object of the invention is to provide a device of this kind which is simple in construction, efficient in operation, durable, and one which can be manufactured at a small cost.

With these and other objects in view, this invention resides in the novel features of construction, formation, combination and arrangement of parts to be hereinafter more fully described, claimed, and illustrated in the accompanying drawings, in which:

Figure 1 is a transverse sectional view through the rake head.

Figure 2 is a similar view showing the rake head inverted.

Figure 3 is a sectional view on the line 3—3 of Figure 1.

Figure 4 is a sectional view on the line 4—4 of Figure 1.

Figure 5 is a sectional view on the line 5—5 of Figure 3.

Referring to the drawings, A designates a rake head which includes a ferrule 1 in which the handle 2 is fitted, said ferrule having laterally disposed arms 3, the terminals of which are provided with bearings 4. These bearings are provided with vertically extending arcuate slots 5, the purpose of which will later appear.

A tubular tooth supporting bar 6 is provided and is rotatably mounted in the bearings 4, and fixed in this bar are the side arms 7 of the U-shaped teeth 8, which are of conventional form. Upon reference to Figure 3 of the drawings, it will be observed that one side arm 7 of a pair of teeth engage the slots 5 of the bearings 4, thus preventing endwise movement of the bar, but permitting the side arms to freely slide in said slots.

A bolt 9 is threaded through the center of the bar 6 so that its upper and lower ends will extend from the bar. To the upper end of the bolt is fixed the forward end of the coil spring 10, the rear end thereof being fixed to the ferrule 1. The tension of the spring is such that it normally holds the arms 7 of the teeth which engage in the slots 5, yieldably engaged with the upper end walls of said slots, as indicated in Figure 1 in full lines.

A yoke 11 is supported by the ferrule 1 and has pivotally connected thereto a latch bar 12, this bar having formed therein a perforation 13. A cross bar 14 is fixed to the side arms of a pair of the teeth 8 and serves to limit the downward swinging movement of the latch bar.

When in use, the rake is drawn rearwardly to collect the litter and at which time the side arms 7 of the teeth occupying the slots 5 will engage the upper end walls of said slots to prevent rocking of the bar 6, thus permitting the teeth to gather the litter. To clean the litter from the teeth it is only necessary to move the rake forwardly and upon exerting slight pressure upon the handle the bar 6 will rock to the position indicated in dotted lines in Figure 1, in order that the teeth will drag upon the lawn, thus dislodging the litter from the teeth. During the forward movement of the rake, the side arms of the teeth operating in the slots 5 will engage the lower end walls thereof to limit the rocking movement of the bar 6. The spring 10 will obviously rock the bar 6 reversely after each cleaning operation to properly position the teeth for gathering litter when the rake is moved rearwardly. Obviously, during these operations the latch bar 12 will rest upon the cross bar 14 to prevent the lower extended end of the bolt 5 from entering the perforation 13, thus permitting free rocking movement of the bar 6 and its associated teeth.

When it is desired to use the opposite ends or bight portions of the teeth 8, the rake head is inverted, whereupon the latch bar will swing downwardly in order that the adjacent extended end of the bolt 5 will enter the perforation 13 of the latch bar, thus holding the bar 6 against rocking in either direction. Upon again inverting the head so that the rake can be used as a self-cleaner, the latch bar will automatically disengage the bolt to permit free rocking movement of the bar and associated teeth.

From the foregoing, it is thought that the construction, operation, and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What is claimed is:

1. A lawn rake comprising a handle member, a toothed head rockably mounted in the handle member, and latch means normally inactive and rendered active upon inverting the rake to hold the toothed head in fixed position.

2. A lawn rake comprising a handle member, a toothed head rockably mounted in the handle member, and a latch pivoted to the handle member and automatically engageable with the toothed head, upon inverting the rake, to hold it in fixed position.

3. A lawn rake comprising a handle member, a toothed head rockably mounted in the handle member, a yoke pivoted to the handle member, and a latch pivoted to the yoke and adapted to engage and fix the position of the toothed head upon inverting the rake.

4. A lawn rake comprising a handle member, a toothed head rockably mounted in the handle member, an element projecting from the toothed head to form a stop, and a latch pivoted to the handle member and perforated to receive said stop upon inverting the rake to hold the toothed head in fixed position.

In testimony whereof I affix my signature.

GERRIT DE VRIES.